(12) United States Patent
Singh et al.

(10) Patent No.: US 10,162,733 B2
(45) Date of Patent: Dec. 25, 2018

(54) DEBUGGING FAILURE OF A SERVICE VALIDATION TEST

(71) Applicants: Hardeep Singh, Nashua, NH (US); Jayesh Patel, Harvard, MA (US); Brian Doyle, Littleton, MA (US)

(72) Inventors: Hardeep Singh, Nashua, NH (US); Jayesh Patel, Harvard, MA (US); Brian Doyle, Littleton, MA (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/198,089

(22) Filed: Jun. 30, 2016

(65) Prior Publication Data

US 2018/0004624 A1    Jan. 4, 2018

(51) Int. Cl.
G06F 11/00 (2006.01)
G06F 11/36 (2006.01)
H04L 12/24 (2006.01)
H04L 12/26 (2006.01)

(52) U.S. Cl.
CPC ........ *G06F 11/366* (2013.01); *G06F 11/3636* (2013.01); *G06F 11/3664* (2013.01); *H04L 41/5009* (2013.01); *H04L 41/5019* (2013.01); *H04L 43/065* (2013.01); *H04L 43/50* (2013.01)

(58) Field of Classification Search
USPC ....................................................... 714/38.1
See application file for complete search history.

(56) References Cited

U.S. PATENT DOCUMENTS 8,937,870 B1    1/2015 Callaghan
2012/0170465 A1    7/2012 Spieser et al.
(Continued)

OTHER PUBLICATIONS

ITU-T, "Series Y: Global Information Infrastructure, Internet Protocol Aspects and Next-Generation Networks, Internet of Things and Smart Cities," ITU-T Telecommunication Standardization Sector of ITU, Y.1564, downloaded Jan. 20, 2017 from https://www.itu.int/rec/T-REC-Y.1564-201602-I, pp. 1-38.
(Continued)

*Primary Examiner* — Sarai E Butler
(74) *Attorney, Agent, or Firm* — Tong, Rea, Bentley & Kim, LLC

(57) ABSTRACT

The present disclosure generally discloses a testing capability related to service testing in a communication network. The testing capability may be configured to support debugging of failures identified during service validation testing of a service in a communication network. The testing capability may be configured to support debugging of failures (e.g., transmission failures or the like) associated with a failed service validation test (e.g., a transmission verification test or the like). The testing capability may be configured to support debugging of failures identified during service validation testing of an Ethernet service. The testing capability may be configured to support debugging of failures (e.g., frame loss or the like) identified during service validation testing of an Ethernet service where the service validation testing of the Ethernet service is performed based on International Telecommunication Union (ITU)—Standardization (ITU-T) Y.1564, which is an Ethernet-based service activation test methodology.

20 Claims, 5 Drawing Sheets

(56) References Cited

U.S. PATENT DOCUMENTS

| | | | | |
|---|---|---|---|---|
| 2013/0007522 A1* | 1/2013 | Kurapati | ............. | G06F 11/3664 |
| | | | | 714/32 |
| 2013/0201316 A1* | 8/2013 | Binder | .................... | H04L 67/12 |
| | | | | 348/77 |
| 2014/0270751 A1* | 9/2014 | Figueria | ................. | H04B 10/00 |
| | | | | 398/16 |
| 2015/0370668 A1* | 12/2015 | Nazari | ................ | H04L 41/0668 |
| | | | | 714/6.3 |
| 2017/0235622 A1* | 8/2017 | Boyapalle | ............. | G06F 11/079 |
| | | | | 714/47.2 |

OTHER PUBLICATIONS

EP Search Report from corresponding EP Application No. 171756158, dated Oct. 27, 2017, 9 pages.

EP Search Report from corresponding EP Application No. 17175615.8, dated Sep. 12, 2018, 6 pages.

Squire, M., "Definitions and Managed Objects for Operations, Administration, and Maintenance (OAM) Functions on Ethernet-Like Interfaces", Network Working Group, RFC 4878, Jun. 2007, 58 pages.

* cited by examiner

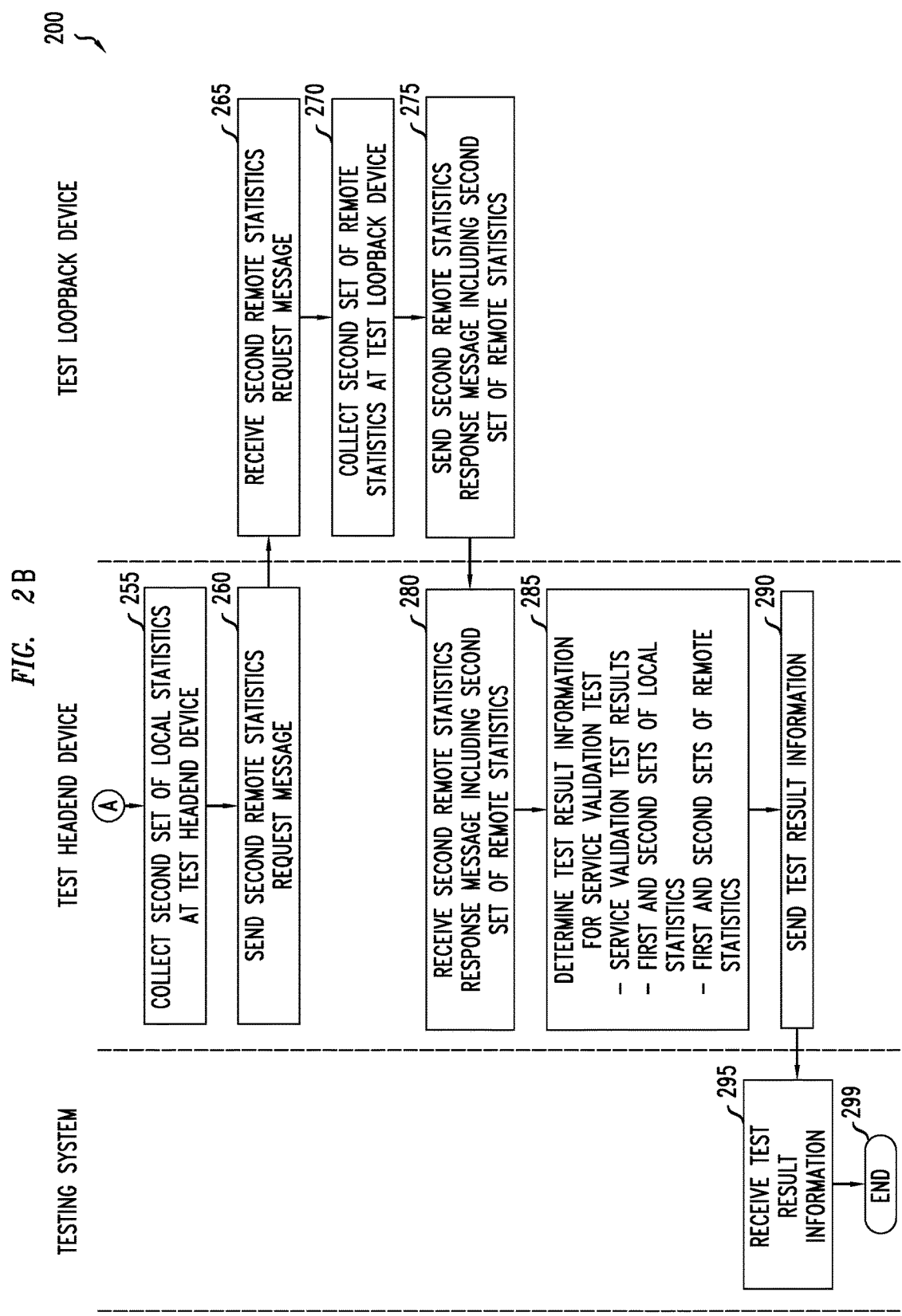

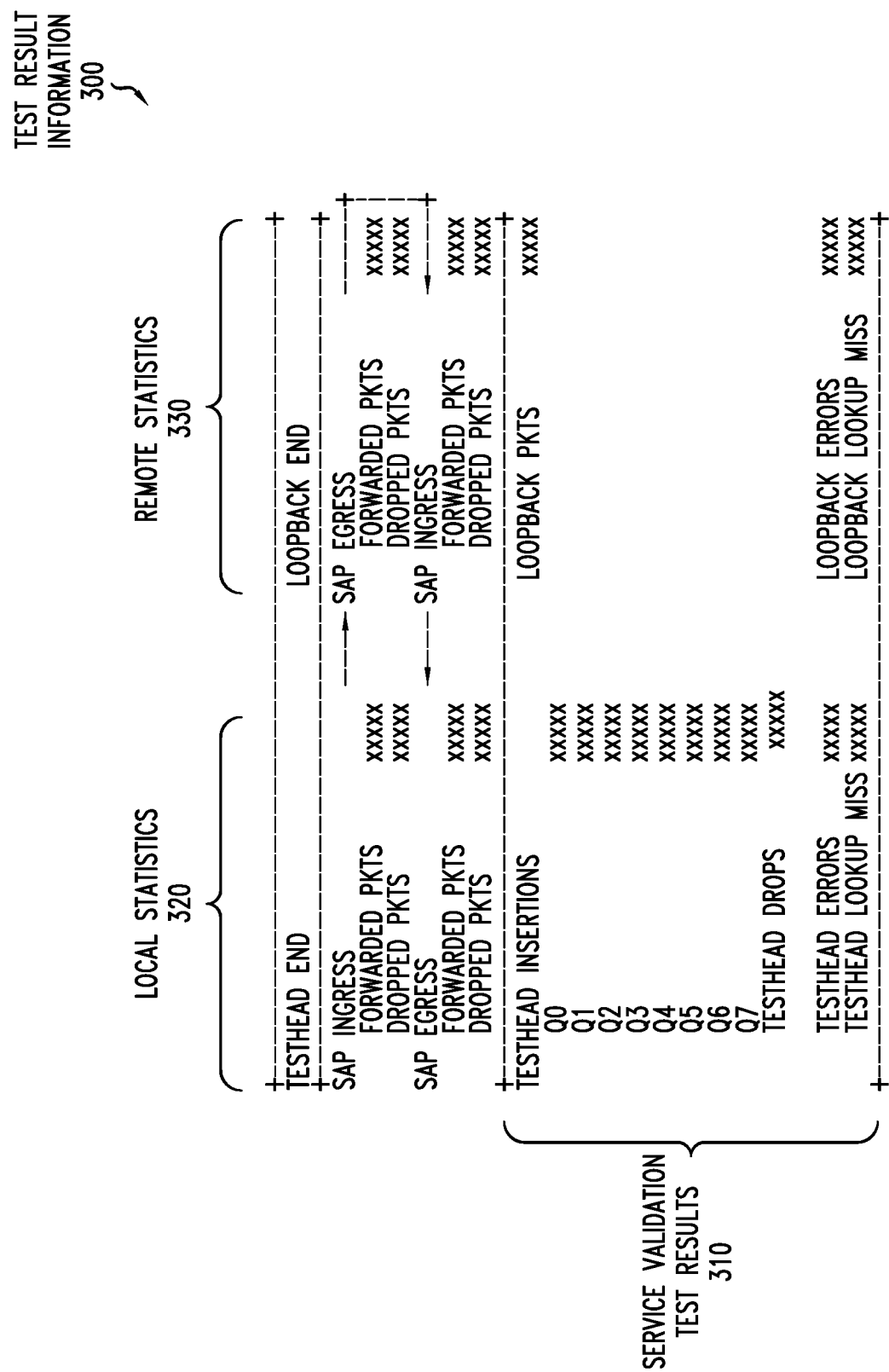

DEBUGGING FAILURE OF A SERVICE VALIDATION TEST

TECHNICAL FIELD

The disclosure relates generally to the field of communication networks and, more particularly but not exclusively, to supporting service validation testing in communication networks.

BACKGROUND

In communication networks, service validation testing is often used to validate the performance of services supported by communication networks. For Ethernet services, for example, International Telecommunication Union (ITU)—Standardization (ITU-T) Y.1564 has been defined as an Ethernet-based service activation test methodology. Y.1564 allows for complete validation of an Ethernet service-level agreement (SLA) of an Ethernet service at service activation in a single test. Y.1564 applies to point-to-point and point-to-multipoint connectivity of Ethernet services in the Ethernet layer and to the network portions that provide, or contribute to, the provisioning of such Ethernet services. Y.1564 may be used to assess the proper configuration and performance of an Ethernet service prior to delivery of the Ethernet service to the customer. Y.1564 may be used as a network SLA validation tool, ensuring that the Ethernet services carried by the network meet their SLA objectives at their maximum committed rate and performing medium-term and long-term service testing to confirming that network elements can properly carry the Ethernet services while under stress during a soaking period. However, Y.1564 and other types of service validation tests may benefit from improvements related to supporting debugging of failures that are identified during service validation tests.

SUMMARY

The present disclosure generally discloses testing mechanisms related to testing in communication networks.

In at least some embodiments, an apparatus is configured to support a service validation test for validating a service between a first device and a second device. The apparatus includes a processor and a memory communicatively connected to the processor. The processor is configured to send, from the first device toward the second device before initiation of the service validation test, a first statistics request message configured to request statistics from the second device. The processor is configured to send, from the first device toward the second device after completion of the service validation test, a second statistics request message configured to request statistics from the second device.

In at least some embodiments, a method is configured to support a service validation test for validating a service between a first device and a second device. The method includes sending, from the first device toward the second device before initiation of the service validation test, a first statistics request message configured to request statistics from the second device. The method includes sending, from the first device toward the second device after completion of the service validation test, a second statistics request message configured to request statistics from the second device.

In at least some embodiments, an apparatus is configured to support a service validation test for validating a service between a first device and a second device. The apparatus includes a processor and a memory communicatively connected to the processor. The processor is configured to receive, at the first device from the second device before initiation of the service validation test, a first statistics request message configured to request statistics from the first device. The processor is configured to receive, at the first device from the second device after completion of the service validation test, a second statistics request message configured to request statistics from the first device.

In at least some embodiments, a method is configured to support a service validation test for validating a service between a first device and a second device. The method includes receiving, at the first device from the second device before initiation of the service validation test, a first statistics request message configured to request statistics from the first device. The method includes receiving, at the first device from the second device after completion of the service validation test, a second statistics request message configured to request statistics from the first device.

BRIEF DESCRIPTION OF THE DRAWINGS

The teachings herein can be readily understood by considering the following detailed description in conjunction with the accompanying drawings, in which:

FIGS. 2A and 2B depict an exemplary method for supporting debugging during service validation testing of a service within a communication network;

FIG. 3 depicts exemplary test result information including statistics for use in supporting debugging during service validation testing of a service within a communication network.

To facilitate understanding, identical reference numerals have been used, where possible, to designate identical elements that are common to the figures.

DETAILED DESCRIPTION

Figure 1:
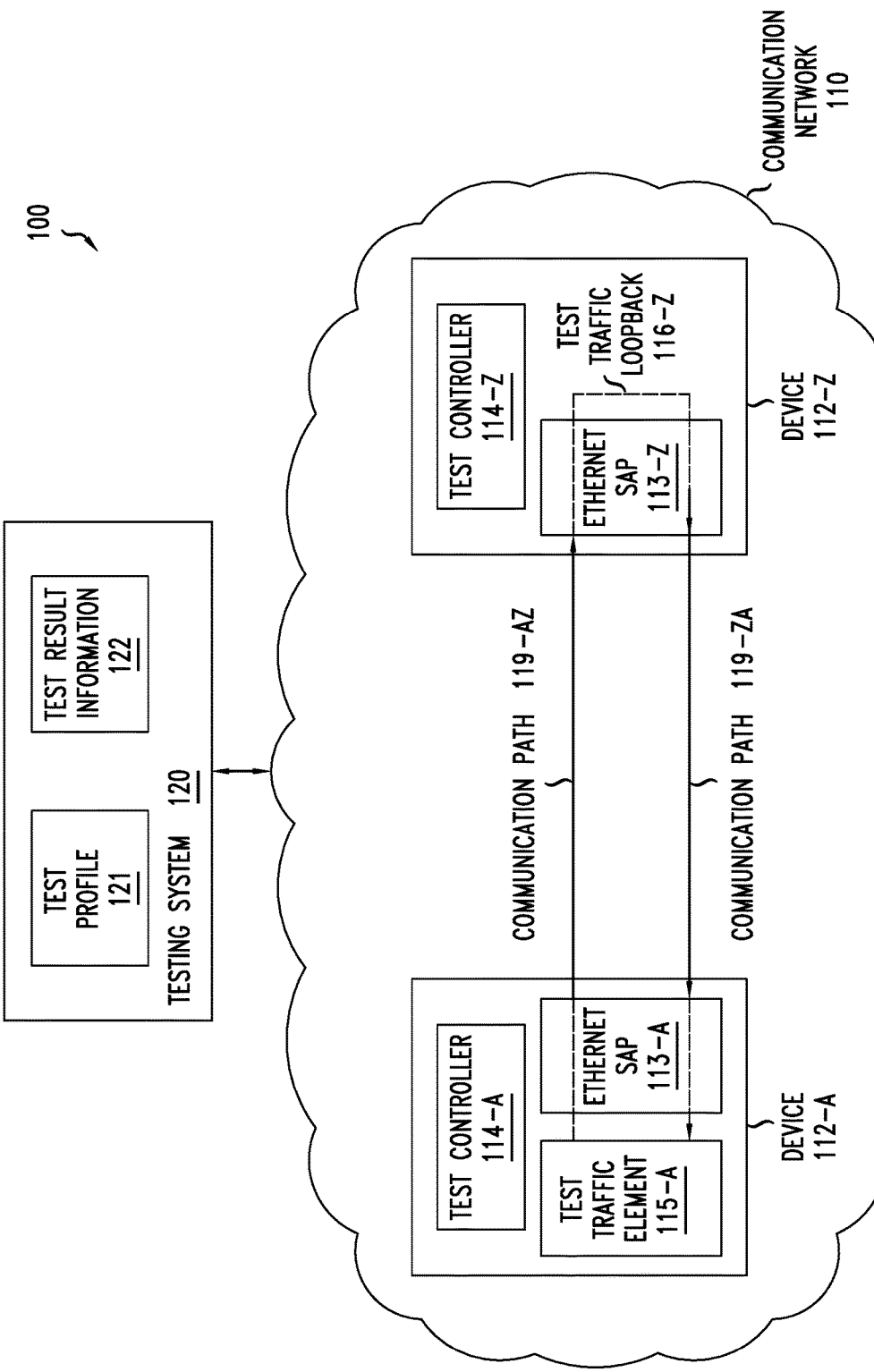
FIG. 1 depicts a system configured to support debugging during service validation testing of a service within a communication network.

The present disclosure generally discloses a testing capability related to service testing in a communication network. The testing capability may be configured to support debugging of failures identified during service validation testing of a service in a communication network. The testing capability may be configured to support debugging of failures (e.g., transmission failures or the like) associated with a failed service validation test (e.g., a transmission verification test or the like). The testing capability may be configured to support debugging of failures (e.g., frame loss or the like) identified during service validation testing of an Ethernet service. The testing capability may be configured to support debugging of failures (e.g., frame loss or the like) identified during service validation testing of an Ethernet service where the service validation testing of the Ethernet service is performed based on International Telecommunication Union (ITU)-Standardization (ITU-T) Y.1564, which is an Ethernet-based service activation test methodology described in the ITU-T Y.1564 standard (which is hereby incorporated herein by reference). The testing capability may be configured to provide, within the context of a service validation test cycle of a service validation test configured for testing a service, a single-ended process that enables localization and debugging of a failed service validation test.

The testing capability may be configured to provide, within the context of a service validation test cycle of a service validation test configured for testing a service, a single-ended process that enables debugging of failures (e.g., transmission failures or the like) associated with a failed service validation test (e.g., a transmission verification test or the like). The testing capability may be configured to support debugging of failures identified during service validation testing of a service, where the service validation testing is performed under the control of a management system using a test headend device and a test loopback device between which the service is configured, by causing the test headend device to collect statistics from the test loopback device in conjunction with the service validation test and to provide the statistics of the test loopback device to the management system in conjunction with providing test results determined by the test headend device during the service validation testing of the service. This may obviate the need for the management system, or an associated user of the management system, to run commands at both ends of the service (again, providing a single-ended process) in order to debug a failure identified during service validation testing of the service (e.g., obviating a need to telnet into the test loopback device and run additional commands on the test loopback device in order to debug a failure identified during service validation testing of the service). These and various other embodiments and potential advantages of the testing mechanism may be further understood by considering the exemplary system of FIG. 1.

FIG. 1 depicts a system configured to support debugging during service validation testing of a service within a communication network.

The system 100 includes a communication network (CN) 110 and a testing system (TS) 120 that is communicatively connected to the CN 110.

The CN 110 is a communication network configured to support Ethernet services. For example, the CN 110 may be configured to support Ethernet services such as point-to-point Ethernet services, point-to-multipoint Ethernet services, or the like. The CN 110 includes a pair of devices 112-A and 112-Z (collectively, devices 112) having an Ethernet service provisioned therebetween. The devices 112-A and 112-Z have Ethernet Service Access Points (SAPs) 113-A and 113-Z (collectively, Ethernet SAPs 113) provisioned thereon, respectively, which represent the provisioning and, thus, availability of the Ethernet service on the respective devices 112. For example, the devices 112 may include two customer edge (CE) routers for an end customer Ethernet service, two provider edge (PE) routers for a network provider Ethernet service, two provider core (PC) routers for a network provider Ethernet service, or any other combination of routers between which Ethernet services may be provisioned. The CN 110 also includes a pair of communication paths including a communication path 119-AZ from device 112-A to device 112-Z and including a communication path 119-ZA from device 112-Z to device 112-A (collectively, communication paths 119) which, it will be understood, may traverse various other devices and associated communication links which may form part of CN 110. It will be appreciated that, although primarily depicted and described with respect to embodiments in which the devices 112 are routers, the devices 112 may include any other Ethernet-enabled devices configured to support Ethernet services. It will be appreciated that, although CN 110 is depicted as including only devices 112 and communication paths 119 (for purposes of clarity), CN 110 may include various other network elements, communication links, or the like as well as various combinations thereof.

The devices 112 are configured to support service validation testing of Ethernet services of the CN 110, which includes service validation testing of the Ethernet service provisioned between the device 112-A and the device 112-Z. The devices 112-A and 112-Z include test controllers 114-A and 114-Z (collectively, test controllers 114), respectively, that are configured to provide functions for controlling service validation testing on respective devices 112-A and 112-Z. The device 112-A includes a test traffic element 115-A that is configured to control use of test traffic to perform service validation testing from device 112-A and the device 112-Z includes test traffic loopback 116-Z that is configured to loop test traffic received from device 112-A back toward device 112-A. The test traffic element 115-A of device 112-A is configured to generate test traffic and to provide the test traffic to an egress portion of Ethernet SAP 113-A on device 112-A for transmission toward device 112-Z. The test traffic loopback 116-Z of device 112-Z is configured to receive test traffic from device 112-A via an ingress portion of Ethernet SAP 113-Z and to provide loopback of the test traffic toward the device 112-A via an egress portion of Ethernet SAP 113-Z. The test traffic element 115-A of device 112-A is configured to receive test traffic from device 112-Z (looped back by test traffic loopback 116-Z of device 112-Z) via an ingress portion of Ethernet SAP 113-A. The test controller 114-A of device 112-A is configured to perform service validation testing analysis (e.g., based on transmission of test traffic from device 112-A toward device 112-Z and reception of corresponding test traffic by device 112-A from device 112-Z) to determine service validation test results. The test controller 114-A of device 112-A is configured to provide the service validation test results to the TS 120.

The TS 120 is configured to support service validation testing of Ethernet services of the CN 110. The TS 120 is configured to support service validation testing of Ethernet services of CN 110. The TS 120 may be configured to support service validation testing of an Ethernet service of CN 110 using a service validation testing procedure. For example, the TS 120 may be configured to support service validation testing of Ethernet services of CN 110 based on the ITU-T Y.1564 service validation testing procedure. The TS 120 may be configured to support service validation testing of an Ethernet service of CN 110 for testing a Service Level Agreement (SLA) of the Ethernet service in order to ensure that the Ethernet service satisfies the SLA of the Ethernet service.

The TS 120 is configured to support service validation testing of the Ethernet service provisioned between the devices 112 of the CN 110. The TS 120 is configured to support service validation testing of the Ethernet service provisioned between the devices 112 of the CN 110 by using device 112-A as a test headend device (i.e., device 112-A also may be referred to as test headend device 112-A) for the service validation test and using device 112-Z as a test loopback device (i.e., device 112-Z also may be referred to as test loopback device 112-Z) for the service validation test. The TS 120 may be configured to control the service validation testing of the Ethernet service provisioned between the devices 112 of the CN 110 by determining a test profile 121 for use by the test headend device 112-A in controlling the service validation test of the Ethernet service, configuring a loopback on the test loopback device 112-Z for enabling the test loopback device 112-Z to support the service validation test of the Ethernet service (illustratively, test traffic loopback 116-Z), and initiating the service validation test of the Ethernet service by sending a service validation test request message to the test headend device 112-A for triggering the test headend device 112-A to interact with the test loopback device 112-Z to perform the service validation test of the Ethernet service. The TS 120 then receives the service validation test results for the service validation test of the Ethernet service from the test headend device 112-A (which, as discussed further below, form part of the test result information 122 that is received by TS 120 from test headend device 112-A).

The system 100 is configured to support additional functions which may supplement service validation testing of Ethernet services of CN 110. The additional functions may include functions which may facilitate debugging of failures detected during service validation testing of Ethernet services of the CN 110. The additional functions may include a single-ended procedure added to the service validation test cycle in order to obtain information which may be used for localizing or debugging a failure identified during service validation testing of Ethernet services of the CN 110. The single-ended procedure may be run from the test headend device 112-A for collecting statistics from the test loopback device 112-Z, such that both the test headend device 112-A and the test loopback device 112-Z may be configured to support additional functions which may supplement service validation testing of Ethernet services of CN 110 (e.g., where test headend device 112-A is configured to initiate collection of statistics from the test loopback device 112-Z, test loopback device 112-Z is configured to respond to requests for statistics from test headend device 112-Z, and the test headend device 112-A is configured to provide the collected statistics of the test loopback device 112-Z to TS 120 in conjunction with providing service validation test results to TS 120). The TS 120 also may be configured to support additional functions which may supplement service validation testing of Ethernet services of CN 110, as TS 120 receives the collected statistics of the test loopback device 112-Z from the test headend device 112-A in conjunction with the service validation test results received from the test headend device 112-A (depicted as test result information 123). The operation of system 100 in supporting a service validation test while also supporting additional functions which may supplement the service validation test may be further understood by way of reference to the exemplary method of FIGS. 2A and 2B.

Figure 2A:
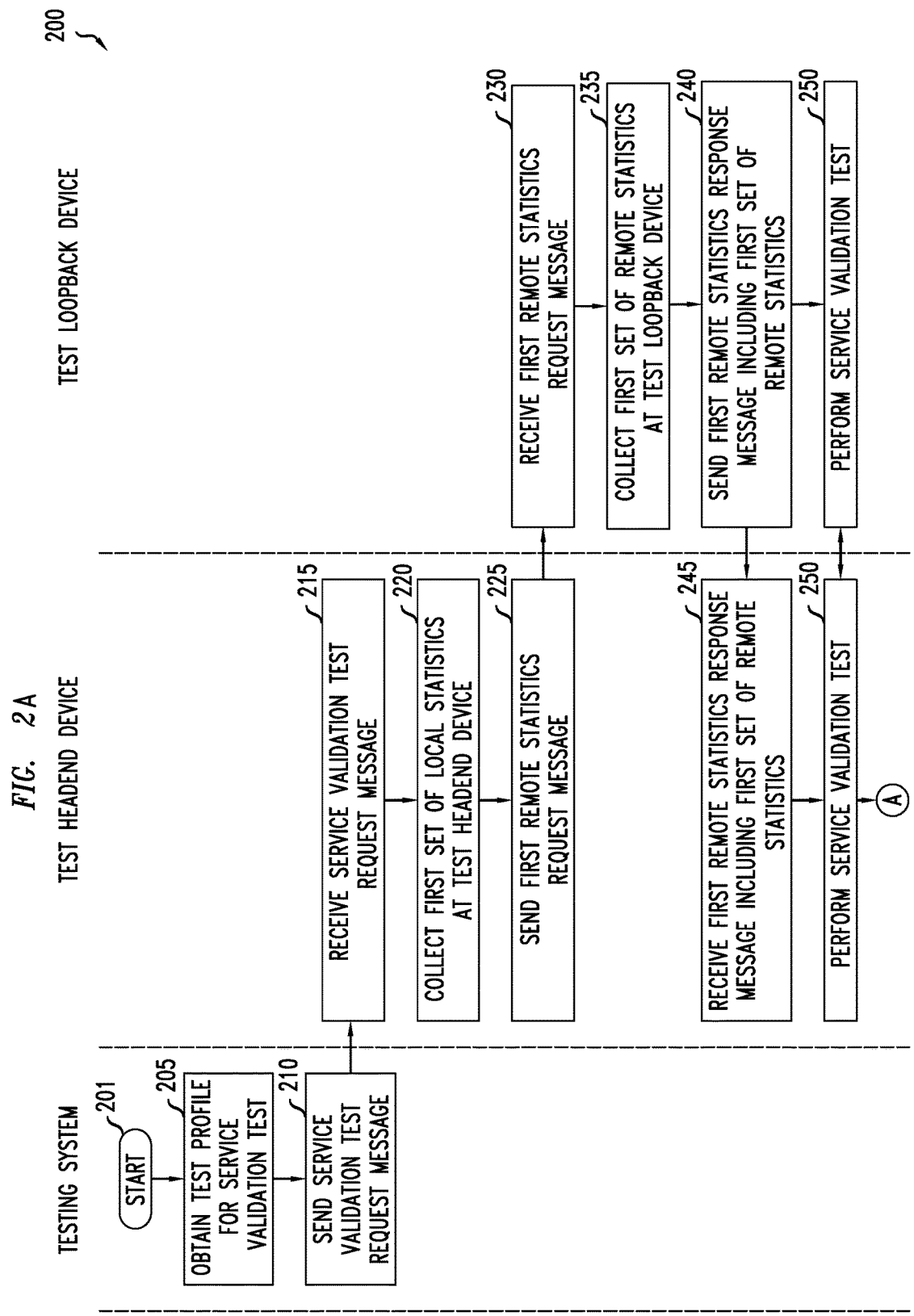

FIGS. 2A and 2B depict an exemplary method for supporting debugging during service validation testing of a service within a communication network. As depicted in FIGS. 2A and 2B, method 200 includes functions performed by the management system that is controlling the service validation testing and functions performed by the devices between which the service validation test is performed (e.g., a test headend device (such as device 112-A of FIG. 1) and a test loopback device (such as device 112-Z of FIG. 1)). It is noted that method 200 of FIGS. 2A and 2B assumes that the test headend device includes a traffic generator configured to generate test traffic used for the service validation test and that the test loopback device has a service loopback configured thereon for looping the test traffic received from the test headend device back toward the test headend device. It will be appreciated that, although primarily presented herein as being performed serially, at least some functions of method 200 may be performed contemporaneously or in a different order than as presented in FIGS. 2A and 2B.

At block 201, method 200 begins.

At block 205, the management system obtains a test profile for the service validation test to be performed between the test headend device and the test loopback device for testing the service between the test headend device and the test loopback device. The test profile may specify various characteristics of the service validation test to be performed. For example, the test profile may specify endpoint information of the endpoints of the test (e.g., source IP address and port number, destination IP address and port number, or the like, as well as various combinations thereof), a time at which the test is to be initiated, a test duration for the test (e.g., 3 minutes, 1 hour, 24 hours, or the like), a traffic type of the traffic to be used for the test (e.g., Ethernet packets, IP packets, or the like), traffic generation parameters for the test (e.g., the number of packets to be generated and transmitted during the test, the content of the packets to be generated and transmitted, the rate at which the packets are to be transmitted, or the like), the types of statistics to be collected during the test (e.g., the number of packets forwarded, the number of packets dropped, the number of errors, the number of packet drops, the number of lookup misses identified, or the like), the service parameters to be validated during the test (e.g., rate, throughput, or the like), or the like, as well as various combinations thereof. The management system may obtain the test profile from memory, from a database, from one or more other systems, or the like, as well as various combinations thereof.

At block 210, the management system sends a service validation test request message to the test headend device. The service validation test request message is configured to indicate to the test headend device that the test headend device is to perform a service validation test for the service. The management system also sends the test profile for the service validation test to the test headend device (e.g., as part of the service validation test request message, in conjunction with the service validation test request message, or the like). The service validation test request message is configured to indicate to the test headend device that the test headend device is to perform the service validation test for the service based on the test profile.

At block 215, the test headend device receives the service validation test request message from the management system. The service validation test request message is configured to indicate to the test headend device that the test headend device is to perform a service validation test for the service. The test headend device also receives the test profile for the service validation test from the management device (e.g., as part of the service validation test request message, in conjunction with the service validation test request message, or the like). The service validation test request message is configured to indicate to the test headend device that the test headend device is to perform the service validation test for the service based on the test profile.

At block 220, before initiation of the service validation test for the service (e.g., during a pre-test dormancy period), the test headend device collects a first set of local statistics at the test headend device. The first set of local statistics of the test headend device provides a set of baseline statistics for the service at the test headend device prior to the service validation test. For example, the first set of local statistics may include statistics related to operation of an ingress SAP of the service on the test headend device (e.g., number of forwarded packets, number of dropped packets, or the like), statistics related to operation of an egress SAP of the service on the test headend device (e.g., number of forwarded packets, number of dropped packets, or the like), or the like, as well as various combinations thereof.

At blocks 225-245, before initiation of the service validation test for the service (e.g., during a pre-test dormancy period of the service validation test), the test headend device collects a first set of remote statistics from the test loopback device. It is noted that the test headend device may collect the first set of remote statistics from the test loopback device at any suitable time during the pre-test dormancy period (e.g., 20 seconds before initiation of the service validation test, 1 minute before initiation of the service validation test, 5 minutes before initiation of the service validation test, or the like). It is noted that waiting in this manner ensures that any the service has settled before the first set of loopback statistics is collected from the test loopback device (e.g., if the service is already active and is being taken offline for the test then this provides time for any user traffic to be removed from the service and for the effects of sending the user traffic via the service to dissipate before the first set of remote statistics is collected from the test loopback device, if the service is not already active then this provides time to ensure that any effects of test traffic previously sent via the service have dissipated before the first set of remote statistics is collected from the test loopback device, or the like).

At block 225, the test headend device sends a first remote statistics request message toward the test loopback device. The first remote statistics request message is configured to trigger the test loopback device to collect a first set of remote statistics at the test loopback device and provide the first set of remote statistics to the test headend device. The first remote statistics request message may be a packet similar to the Marker Packet.

At block 230, the test loopback device receives the first remote statistics request message from the test headend device.

At block 235, the test loopback device collects the first set of remote statistics at the test loopback device. The first set of remote statistics of the test loopback device provides a set of baseline statistics for the service at the test loopback device prior to the service validation test. The first set of remote statistics may include regular statistics, debug statistics, or the like, as well as various combinations thereof. For example, the first set of remote statistics of the test loopback device may include statistics related to operation of an ingress SAP of the service on the test loopback device (e.g., number of forwarded packets, number of dropped packets, or the like), statistics related to operation of a loopback on the test loopback device (e.g., number of forwarded packets, number of dropped packets, or the like), statistics related to operation of an egress SAP of the service on the test loopback device (e.g., number of forwarded packets, number of dropped packets, or the like), or the like, as well as various combinations thereof.

At block 240, the test loopback device sends a first remote statistics response message, including the first set of remote statistics, to the test headend device.

At block 245, the test headend device receives the first remote statistics response message, including the first set of remote statistics, from the test loopback device.

At block 250, the test headend device and the test loopback device perform the service validation test. This is denoted as a solid arrow from block 245 to block 250 for the test headend device since the test headend device initiates the service validation test and is depicted as a dashed line from block 240 to block 250 for the test loopback device since the test loopback device responds to the service validation test initiated by the test headend device. The service validation test for the service may be performed in accordance with the test profile received from the management system. The service validation test for the service may be performed in various ways. The service validation test may be performed by generating test traffic at the test headend device, transmitting the test traffic from the test headend device to the test loopback device via the service being tested, directing the test traffic from the test loopback device toward the test headend device using a service loopback configured on the test loopback device for the service validation test, transmitting the test traffic from the test loopback device back to the test headend device via the service being tested, and processing the test traffic received at the test headend device to determine test results for the service validation test. For example, the service validation test may include sending 1000 test packets (64 bytes each and, thus, 512 bits each) from the test headend device toward the test loopback device beginning at a time t1 at a rate of 100 Mbps over a transmission duration of 6 seconds (corresponding to a throughput of 85.3 Mbps) and, upon receiving test packets back from the test loopback device, determining one or more of the number of packets received (for comparison with the number of packets sent in order to determine if any of the test packets were lost), the time t2 at which the test packets are received (for determining a round trip time (RTT) for the service based on a difference between t2 and t1), the duration of time over which the test packets are received (for determining throughput based on the number of test packets received and the duration of time over which the test packets are received, for determining jitter, or the like), or the like, as well as various combinations thereof. For example, in continuation of the above example, based on a determination that the test headend device receives 998 test packets at time t2 at a rate of 100 Mbps over a duration of 6.1 seconds, the test headend device may determine that two test packets were dropped, that the RTT is given by t2−t1, and that the throughput dropped from 85.3 Mbps to 83.8 Mpbs. It will be appreciated that various other parameters may be specified for controlling the transmission of the test packets by the test headend device and various other types of service validation test results may be determined by the test headend device based on the transmission and reception of the test packets generated by the test headend device. The service may be an Ethernet service, in which case the service validation test may be performed by the test headend device and the test loopback device based on the Y.1564 standard. The service validation test may be implemented in other ways for determining test results related to validation of the service.

At block 255, after completion of the service validation test for the service (e.g., during a post-test dormancy period of the service validation test), the test headend device collects a second set of local statistics at the test headend device. The second set of local statistics of the test headend device provides a set of statistics for the service at the test headend device after completion of the service validation test. For example, the second set of local statistics may include statistics related to operation of an ingress SAP of the service on the test headend device (e.g., number of forwarded packets, number of dropped packets, or the like), statistics related to operation of an egress SAP of the service on the test headend device (e.g., number of forwarded packets, number of dropped packets, or the like), or the like, as well as various combinations thereof.

At block 260-280, after completion of the service validation test for the service (e.g., during a post-test dormancy period), the test headend device collects a second set of remote statistics from the test loopback device. It is noted that the test headend device may collect the second set of remote statistics from the test loopback device at any suitable time during the post-test dormancy period (e.g., 20 seconds after completion of the service validation test, 1 minute after the service validation test, 5 minutes after the service validation test, or the like). It is noted that waiting in this manner ensures that any effects of sending the test traffic via the service have dissipated before the second set of remote statistics is collected from the test loopback device.

At block 260, the test headend device sends a second remote statistics request message toward the test loopback device. The second remote statistics request message is configured to trigger the test loopback device to collect a second set of remote statistics at the test loopback device and provide the second set of remote statistics to the test headend device. The second remote statistics request message may be a packet similar to the Marker Packet.

At block 265, the test loopback device receives the second remote statistics request message from the test headend device.

At block 270, the test loopback device collects the second set of remote statistics at the test loopback device. The second set of remote statistics of the test loopback device provides a set of post-test statistics for the service at the test loopback device after the service validation test. The second set of remote statistics may include regular statistics, debug statistics, or the like, as well as various combinations thereof. For example, the second set of remote statistics of the test loopback device may include statistics related to operation of an ingress SAP of the service on the test loopback device (e.g., number of forwarded packets, number of dropped packets, or the like), statistics related to operation of a loopback on the test loopback device (e.g., number of forwarded packets, number of dropped packets, or the like), statistics related to operation of an egress SAP of the service on the test loopback device (e.g., number of forwarded packets, number of dropped packets, or the like), or the like, as well as various combinations thereof.

At block 275, the test loopback device sends a second remote statistics response message, including the second set of remote statistics, to the test headend device.

At block 280, the test headend device receives the second remote statistics response message, including the second set of remote statistics, from the test loopback device.

At block 285, the test headend device determines test result information for the service validation test. The test result information may include service validation test results from the service validation test. The test result information also may include service validation test statistics associated with the service validation test, which may include the first and second sets of local statistics collected at the test headend device (and/or a combined set of local statistics associated with the test headend device which may be determined by the test headend device based on processing of the first and second sets of local statistics collected at the test headend device) and the first and second sets of remote statistics received at the test headend device from the test loopback device (and/or a combined set of remote statistics associated with the test loopback device which may be determined by the test headend device based on processing of the first and second sets of remote statistics received at the test headend device from the test loopback device). An exemplary set of test result information for a service validation test of an Ethernet service is depicted and described herein with respect to FIG. 3.

At block 290, the test headend device sends the test result information for the service validation test to the management system.

At block 295, the management system receives the test result information for the service validation test from the test headend device. The management system may handle the test result information for the service validation test in various ways. The management system may store the test result information, initiate presentation of the test result information via one or more user terminals, send the test result information toward one or more other systems (e.g., one or more other management systems), process the test result information for determining whether or not a failure was identified during the service validation test, generate one or more alerts based on a determination that a failure was identified during the service validation test, or the like, as well as various combinations thereof.

At block 299, method 200 ends.

FIG. 3 depicts exemplary test result information including statistics for use in supporting debugging during service validation testing of a service within a communication network.

As depicted in FIG. 3, the test result information 300 includes service validation test results 310, local statistics 320 collected at the test headend device (which is denoted as TESTHEAD end), and remote statistics 330 collected by the test headend device from the test loopback device (which is denoted as LOOPBACK end).

The service validation test results 310 include a number of Testhead Insertion statistics (denoted as Q1-Q7), a Testhead Drops statistic, a Testhead Errors statistic, a Testhead Lookup Miss statistic, a Loopback Packets statistic, and a Loopback Lookup Miss statistic.

The local statistics 320 collected at the test headend device include Forwarded Packets and Dropped Packets statistics for both the SAP ingress on the test headend device and the SAP egress on the test headend device.

The remote statistics 330 collected by the test headend device from the test loopback device include Forwarded Packets and Dropped Packets statistics for both the SAP ingress on the test loopback device and the SAP egress on the test loopback device.

It will be appreciated that the test result information 300 may include less or more test information, may be organized in other ways, or the like, as well as various combinations thereof.

It will be appreciated that, although primarily presented herein with respect to embodiments in which a particular type of service validation test is performed for a particular type of service (namely, a Y.1564-based service validation test for Ethernet services), various embodiments presented herein may be used, or adapted for use, for performing other types of service validation tests, for performing service validation tests for other types of services, or the like, as well as various combinations thereof.

Figure 4:
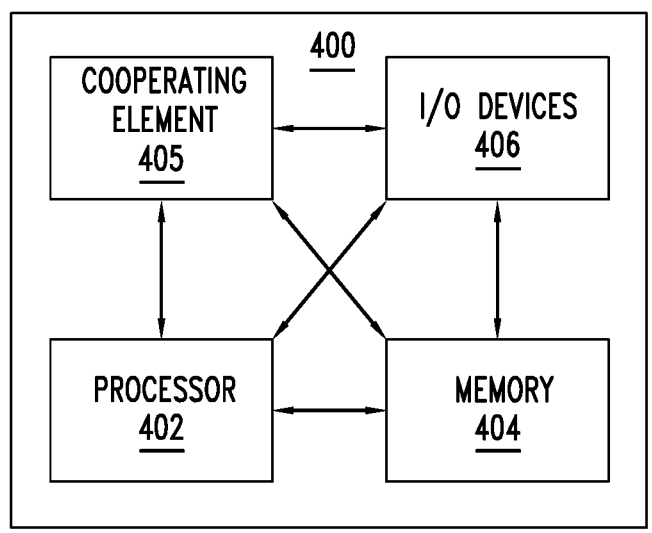
FIG. 4 depicts a high-level block diagram of a computer suitable for use in performing various functions described herein.

FIG. 4 depicts a high-level block diagram of a computer suitable for use in performing various functions described herein.

The computer 400 includes a processor 402 (e.g., a central processing unit (CPU), a processor having a set of processor cores, a processor core of a processor, or the like) and a memory 404 (e.g., a random access memory (RAM), a read only memory (ROM), or the like). The processor 402 and the memory 404 are communicatively connected.

The computer 400 also may include a cooperating element 405. The cooperating element 405 may be a hardware device. The cooperating element 405 may be a process that can be loaded into the memory 404 and executed by the processor 402 to implement functions as discussed herein (in which case, for example, the cooperating element 405

(including associated data structures) can be stored on a non-transitory computer-readable storage medium, such as a storage device or other storage element (e.g., a magnetic drive, an optical drive, or the like)).

The computer 400 also may include one or more input/output devices 406. The input/output devices 406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 400 of FIG. 4 may represent a general architecture and functionality suitable for implementing functional elements described herein, portions of functional elements described herein, or the like, as well as various combinations thereof. For example, computer 400 may provide a general architecture and functionality that is suitable for implementing one or more of a device 112, TS 120, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus configured to support a service validation test for validating a service between a first device and a second device, the apparatus comprising:
a processor and a memory communicatively connected to the processor, the processor configured to:
send, from the first device toward the second device before initiation of the service validation test, a first statistics request message configured to request statistics from the second device; and
send, from the first device toward the second device after completion of the service validation test, a second statistics request message configured to request statistics from the second device.

2. The apparatus of claim 1, wherein the processor is configured to:
receive, at the first device from the second device based on the first statistics request message, a first statistics response message comprising a first set of statistics of the second device; and
receive, at the first device from the second device based on the second statistics request message, a second statistics response message comprising a second set of statistics of the second device.

3. The apparatus of claim 2, wherein the processor is configured to:
process the first set of statistics of the second device and the second set of statistics of the second device to determine a set of combined statistics associated with the second device.

4. The apparatus of claim 3, wherein the processor is configured to:
send the set of combined statistics associated with the second device from the first device toward a management system.

5. The apparatus of claim 1, wherein the processor is configured to:
collect, at the first device before initiation of the service validation test, a first set of local statistics of the first device; and
collect, at the first device after completion of the service validation test, a second set of local statistics of the first device.

6. The apparatus of claim 5, wherein the processor is configured to:
process the first set of local statistics of the first device and the second set of local statistics of the first device to determine a set of combined local statistics of the first device.

7. The apparatus of claim 6, wherein the processor is configured to:
send the set of combined local statistics of the first device from the first device toward a management system.

8. The apparatus of claim 1, wherein the processor is configured to:
send test traffic from the first device toward the second device for performing the service validation test; and
receive, by the first device from the second device, the test traffic sent from the first device toward the second device for performing the service validation test.

9. The apparatus of claim 1, wherein the first device comprises a test headend for the service validation test and the second device comprises a test loopback for the service validation test.

10. The apparatus of claim 1, wherein the service comprises an Ethernet service, wherein the service validation test comprises an ITU-T Y.1564 test.

11. A method configured to support a service validation test for validating a service between a first device and a second device, the method comprising:
sending, from the first device toward the second device before initiation of the service validation test, a first statistics request message configured to request statistics from the second device; and
sending, from the first device toward the second device after completion of the service validation test, a second statistics request message configured to request statistics from the second device.

12. An apparatus configured to support a service validation test for validating a service between a first device and a second device, the apparatus comprising:
- a processor and a memory communicatively connected to the processor, the processor configured to:
  - receive, at the first device from the second device before initiation of the service validation test, a first statistics request message configured to request statistics from the first device; and
  - receive, at the first device from the second device after completion of the service validation test, a second statistics request message configured to request statistics from the first device.

13. The apparatus of claim 12, wherein the processor is configured to:
- collect, at the first device based on the first statistics request message, a first set of statistics of the first device; and
- send, from the first device toward the second device, a first statistics response message comprising the first set of statistics of the first device.

14. The apparatus of claim 12, wherein the processor is configured to:
- collect, at the first device based on the second statistics request message, a second set of statistics of the first device; and
- send, from the first device toward the second device, a second statistics response message comprising the second set of statistics of the first device.

15. The apparatus of claim 12, wherein the processor is configured to:
- send, from the first device toward the second device based on the first statistics request message, a first statistics response message comprising a first set of statistics of the first device; and
- send, from the first device toward the second device based on the second statistics request message, a second statistics response message comprising a second set of statistics of the first device.

16. The apparatus of claim 15, wherein the first set of statistics of the first device comprises a first set of loopback debug statistics, wherein the second set of statistics of the first device comprises a second set of loopback debug statistics.

17. The apparatus of claim 12, wherein the processor is configured to:
- receive, at the first device from the second device, test traffic sent by the second device for performing the service validation test; and
- send the test traffic from the first device toward the second device based on loopback of the test traffic by the first device.

18. The apparatus of claim 12, wherein the first device comprises a test headend for the service validation test and the second device comprises a test loopback for the service validation test.

19. The apparatus of claim 12, wherein the service comprises an Ethernet service, wherein the service validation test comprises an ITU-T Y.1564 test.

20. A method configured to support a service validation test for validating a service between a first device and a second device, the method comprising:
- receiving, at the first device from the second device before initiation of the service validation test, a first statistics request message configured to request statistics from the first device; and
- receiving, at the first device from the second device after completion of the service validation test, a second statistics request message configured to request statistics from the first device.

* * * * *